United States Patent [19]

Seib et al.

[11] Patent Number: 5,301,745
[45] Date of Patent: Apr. 12, 1994

[54] INSTALLATION FOR HEAT RECOVERY

[76] Inventors: Klaus Seib; Hans W. Thomas, both of Wörrstädter Str. 98, D-W 6505 Nierstein; Rudolf S. Kodron, Adam-Karrillon-Str. 30, D-W 6500 Mainz 1, all of Fed. Rep. of Germany

[21] Appl. No.: 6,387

[22] Filed: Jan. 19, 1993

[51] Int. Cl.⁵ .................... F24D 17/00; F24H 1/16; F24J 3/04; F28D 21/00
[52] U.S. Cl. .................... 165/47; 165/909; 165/66; 165/119; 4/598; 4/545; 4/665
[58] Field of Search .............. 165/47, 66, 909, 119; 4/598, 545, 665

[56] References Cited

U.S. PATENT DOCUMENTS

| | | | |
|---|---|---|---|
| 3,946,802 | 3/1976 | Christenson | 165/47 |
| 4,422,932 | 12/1983 | Kalberer | 165/47 |
| 5,143,149 | 9/1992 | Kronberg | 165/66 |

FOREIGN PATENT DOCUMENTS

| | | | |
|---|---|---|---|
| 0088055 | 9/1993 | European Pat. Off. | |
| 2415877 | 10/1975 | Fed. Rep. of Germany | |
| 2538168 | 3/1977 | Fed. Rep. of Germany | |
| 2908679 | 9/1980 | Fed. Rep. of Germany | |
| 2917987 | 11/1980 | Fed. Rep. of Germany | 165/47 |
| 3202804 | 8/1982 | Fed. Rep. of Germany | 165/47 |
| 3113784 | 10/1982 | Fed. Rep. of Germany | |
| 3223422 | 1/1984 | Fed. Rep. of Germany | 165/47 |
| 2381257 | 9/1978 | France | 165/909 |
| 2490329 | 3/1982 | France | |
| 0189236 | 10/1984 | Japan | 165/47 |

Primary Examiner—John K. Ford
Attorney, Agent, or Firm—Meltzer, Lippe, Goldstein, Wolf, Schlissel & Sazar

[57] ABSTRACT

An installation for heat recovery from warm household drain water produced at household water consumption points, comprising a distributor tank, a first pipeline system which delivers warm household drain water from the consumption points to the distributor tank, a drain water channel, a heat exchange tank, and a second pipeline system which conveys warm household drain water to the heat exchange tank. The distributor tank has a first outlet leading into the drain water channel with a shut-off device which opens when the household drain water is below a predetermined temperature, and a second outlet into the second pipeline system when the household drain water in the distributor tank is above the predetermined temperature. Within the heat exchange tank is a coil containing cold drinking water which is heated by the household drain water. The cold drinking water which is heated by the warm drain water is conveyed from the heat exchange coil either directly to the consumption points by a third pipeline system, or to the consumption points via a boiler by fourth and fifth pipeline systems, while the household is conveyed either by a sixth pipeline (F) to the drain water channel (G) or to a drain water collecting tank 18 and from there by a pipeline (H) to the toilet flushing water tank.

4 Claims, 1 Drawing Sheet

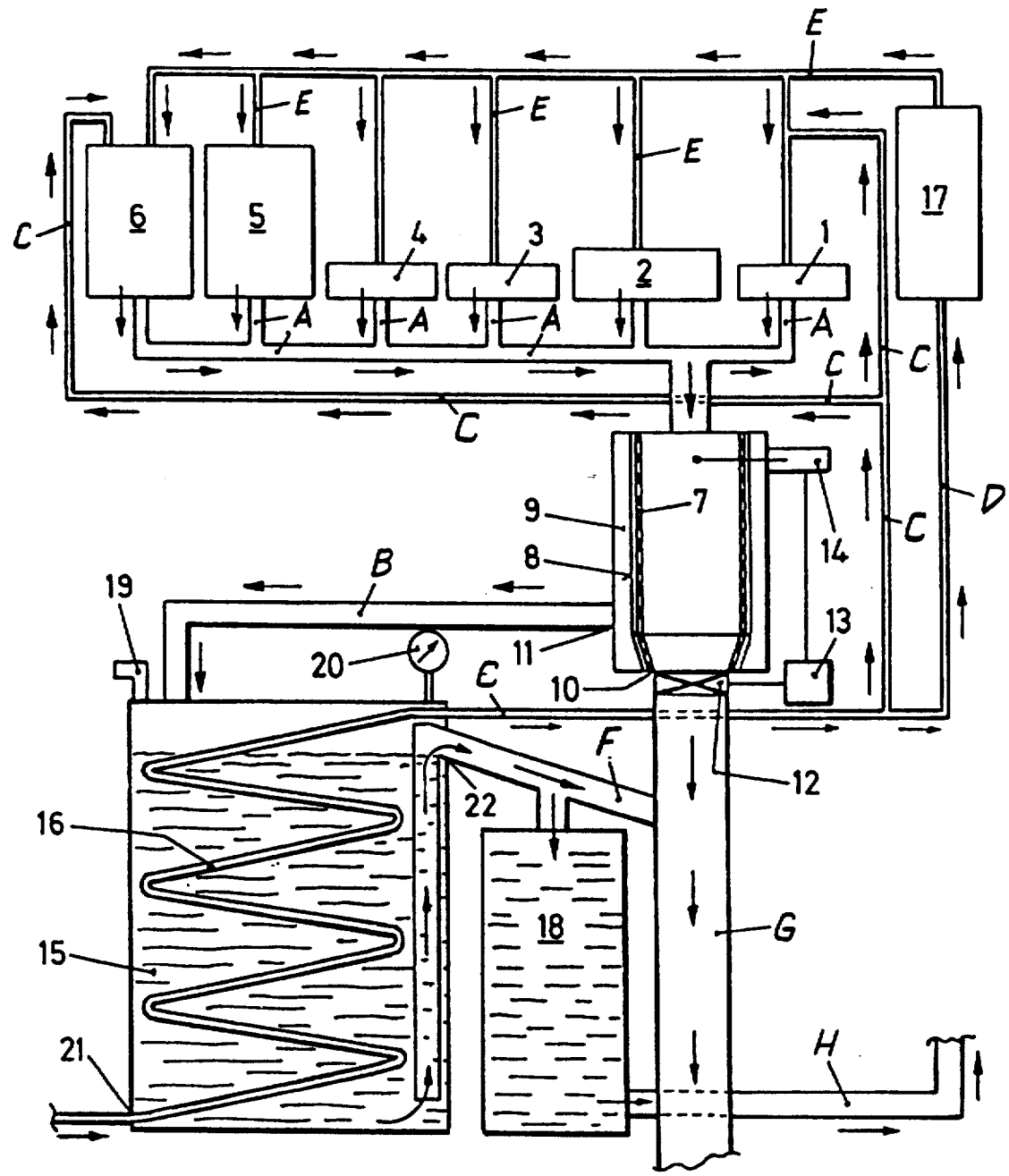

INSTALLATION FOR HEAT RECOVERY

BACKGROUND OF THE INVENTION

The instant invention relates to an installation for heat recovery from warm household drain water with a first pipeline system to collect the warm drain water from the consumption points of the household and to convey same into a tank which is provided with a first outlet leading into the drain water channel.

In a household, quantities of heat are produced at various drinking water consumption points which are lost without being used together with the heated drain water flowing off after completed water consumption.

Efforts in the recovery of drain water heat which have become known until now apply mostly to individual water utilization points and therefore achieve only minimal energy savings.

An installation disclosed for example by EP 0 088 055 A1 merely collects the warm drain water of the kitchen sink and of a dish washer or of a washing machine and conveys these two drain water quantities to the collection tank of an electric heat pump from which a pump pumps the drain water received into the drain water channel after having removed heat from it until the temperature has been lowered to 4–6° C.

This installation does not collect the totality of warm drain water produced in the household and requires an expensive, complicated and energy-consuming electric heat pump which is soon clogged up by dirty drain water.

It is the object of the instant invention to achieve simple, low-maintenance heat recovery without energy and without using a heat pump to recover heat as much as possible from all warm drain water produced in a household once it has been separated from cold drain water, it being furthermore possible for the drain water subjected to heat recovery to be used as toilet flushing water.

SUMMARY OF THE INVENTION

This object is attained by the invention in that the tank is made in the form of a distributor tank and is equipped with an inner wall filter and in that the outlet going into the drain water channel can be closed by means of a shut-off device via a solenoid valve and a temperature sensor measuring the water temperature in the distributor tank. The distributor tank is provided with a second outlet through which the drain water cleaned by the interior wall filter and which has a temperature above a predetermined adjustable temperature can be diverted into a second pipeline in a heat exchange tank. The heat exchange tank is connected to the drain water channel via an overflow pipe and is equipped with a heat-exchange pipe coil through which cold drinking water is conveyed which can be fed through a third pipeline system to the consumption points of the household on the one hand and through a fourth pipeline to a boiler on the other hand, said boiler being connected via a fifth pipeline system to the different consumption points of the household.

In an altered embodiment of an installation of this type, a drain water collecting tank connected via a sixth pipeline to the toilet flush water tank is connected to the overflow pipe of the heat exchange tank so that the drinking water consumption is thereby reduced in the household thanks to the fact that no fresh drinking water is used for the toilet flush box. This reduces drinking water consumption in the household by 33%.

BRIEF DESCRIPTION OF THE DRAWINGS

An embodiment of the invention is explained in greater detail below through the schematic drawing of FIG. 1.

DETAILED DESCRIPTION OF THE INVENTION

The different consumption points in the household, i.e. the shower 1, the bathtub 2, the bathroom sink 3, the kitchen sink 4, the dish washer 5 and the washing machine 6 drain their heated drain water via pipeline system I into a distributor tank 9 which is equipped with a double-wall interior filter 7, 8. The inner filter wall 7 is a coarse filter and the outer filter wall 8 is a fine filter.

The distributor tank 9 is provided with the two outlets 10 and 11. The outlet 10 can be closed by means of a shut-off device 12 which is controlled via a connected solenoid valve 13 and a temperature sensor 14 which measures the water temperature in the distributor tank 9. When the temperature sensor 14 measures a temperature in the distributor tank 9 that is lower than a pre-set temperature level of, e.g., 35° C., the shut-off device 12 opens and lets the drain water of the distributor tank 9 flow into the drain water channel G.

If on the other hand heated drain water at more than the pre-set temperature level flows into the distributor tank 9 the shut-off device 12 closes and the warm drain water flows through the second outlet 11 through pipeline B into a heat exchanger 15. The latter is equipped with aeration openings 19 and with a manometer 20 as well as with a drinking water arrival opening 21 through which fresh drinking water at e.g. 10° C. flows into a pipe coil 16 located in the heat exchanger tank 15.

Once the warm drain water collected in the heat exchanger tank 15 has surrendered its heat to the drinking water in pipe coil 16, it leaves through outlet opening 22 of the heat exchange tank in a cooled state and is conveyed through the drain water flow-off pipe G to the drain water channel VII.

A drain water collection tank 18 connected by means of a pipeline H to the toilet flushing water tank (not shown in the drawing) can be connected to the drain water flow-off pipe F so that the toilet flushing water tank is not supplied with clean drinking water but with household drain water, making it possible to lower drinking water consumption in the household by approximately one third.

The drinking water heated in the pipe coil 16 in the heat exchange tank 15 is fed through pipeline C in the form of prewarmed additive cold water to the shower 1, for example, and to the washing machine 6 while the rest of the warmed drinking water is fed through the branching-off pipeline IV to a boiler 17 which heats the pre-warmed fresh water to approximately 60° C.

This heated fresh water then goes through pipeline system E to the different water consumption points 1 to 6 in the household and is available for consumption at these points.

In the system described for heat recovery from dirty drain water a self-cleaning process in the distributor tank 9 which is endangered by dirt is achieved through the fact that cool drain water very often flows at high speed through the distributor tank 9 into the drain water channel G when the shut-off device 12 is open and carries along dirt particles deposited on the inside of the coarse filter 7, cleaning said coarse filter 7 in this manner.

The entire installation for heat recovery thus optimally uses all the heated drain water produced at the different household water consumption points and conveys it to a central heat recovery unit, overcoming possible clogging problems by means of an integrated self-cleaning system.

While the invention has been described by reference to a specific embodiment, this was for purposes of illustration only. Numerous alternative embodiments will be apparent to those skilled in the art without departing from the spirit and scope of the invention.

We claim:

1. Installation for heat recovery from warm household drain water produced at household water consumption points, comprising
    a distributor tank,
    a first pipeline system (A) which collects warm household drain water from said consumption points and delivers it to said distributor tank,
    said distributor tank having a first outlet leading into a drain water channel (V), a temperature sensor which senses the temperature of the drain water in the distributor tank, and a shut-off device with a solenoid valve located at said first outlet which opens the first outlet leading into the drain water channel (G) when the temperature of the drain water in the distributor tank is below a predetermined temperature,
    said distributor tank having a second outlet leading into a second pipeline system (B) when the drain water in the distributor tank is above said predetermined temperature,
    a heat exchange tank supplied by the drain water in the second pipeline system (B).
    an overflow pipe (F) connecting the drain water in said heat exchange tank to said drain water channel (G),
    a heat exchange coil through which cold drinking water is conveyed disposed within said heat exchange tank and in thermal communication with said drain water in said heat exchange tank,
    a third pipeline system (C) connected to said heat exchange coil and conveying said drinking water away from said heat exchange tank and some of said drinking water to said household consumption points,
    a fourth pipeline system (D) connected to said third pipeline system (C) and conveying the remainder of said drinking water in said third pipeline system (C) to a boiler, and
    a fifth pipeline system (E) conveying the water in said boiler to said household consumption points.

2. The installation of claim 1 wherein said distributor tank has an interior wall filter, the water in said distributor tank passing through said second outlet after it has passed through said filter.

3. The installation of claim 2 wherein said filter is a dual wall filter.

4. The installation of claim 3 wherein the household drain water coming from the heat exchange tank is conveyed either by a sixth pipeline (F) to the drain water channel (G) or to a drain water collecting tank 18 and from there by a pipeline (H) to the toilet flushing water tank.

* * * * *